United States Patent [19]

Leake

[11] Patent Number: 4,787,937

[45] Date of Patent: Nov. 29, 1988

[54] HIGH SOLIDS CORRUGATING ADHESIVE

[75] Inventor: Craig H. Leake, Edison, N.J.

[73] Assignee: National Starch and Chemical Corporation, Bridgewater, N.J.

[21] Appl. No.: 103,084

[22] Filed: Sep. 30, 1987

[51] Int. Cl.$^4$ ............................................. C08L 3/00
[52] U.S. Cl. ................................... 106/213; 156/336
[58] Field of Search ................ 106/213; 156/328, 336

[56] References Cited

U.S. PATENT DOCUMENTS

| 2,102,937 | 12/1937 | Bauer | 106/213 |
| 3,300,360 | 1/1967 | Williams et al. | 156/292 |
| 4,329,181 | 5/1982 | Chiu | 106/213 |

FOREIGN PATENT DOCUMENTS 7901095  7/1968  Canada .................................. 154/72

OTHER PUBLICATIONS

TAPPI vol. 60, No. 4, Apr. 1977, pp. 86–89, "Influence of Carrier Starch on Green Bond Strength in Corrugating Adhesives".

Primary Examiner—Theodore Morris
Attorney, Agent, or Firm—Edwin M. Szala; Ellen T. Dec

[57] ABSTRACT

Alkaline-curing, starch-based corrugating adhesives employing ungelatinized tapioca starch and a carrier comprising high amylose starch, wherein the total solids of the adhesive is from 30 to 45% solids by weight, are disclosed. Said adhesives provide improved tack and corrugator running speeds.

12 Claims, No Drawings

HIGH SOLIDS CORRUGATING ADHESIVE

This invention relates to a starch-based alkaline corrugating adhesive composition which provides improved corrugator running speeds. More particularly, it relates to relatively high solids corrugating adhesive compositions employing tapioca starch as the ungelatinized raw starch together with a gelatinized carrier component comprising a high amylose starch.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use of operation of corrugators in general are described in U.S. Pat. Nos. 2,102,937 and 2,051,025 to Bauer.

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond.

It is often desired or necessary in the manufacture of corrugated paperboard that the adhesive composition used in the process is selected to emphasize one or more important properties such as water resistant bonds, viscosity stability, pot life and the like. The adhesive compositions of the present invention are formulated to possess improved tack (also known in the corrugating art as "green bond strength") which translates to increased corrugator running speeds.

There are different theories regarding the respective roles of the raw starch and the carrier in the development of adhesive properties, but there is substantial evidence to support the view that the carrier contributes to the bond strength and set speed of the adhesive, and that good tack in the carrier leads to good tack and therefore improved runnability in the full-formulation adhesive (see R. Williams, C. Leake and M. Silano, TAPPI, Vol. 60 Nr 4 April/1977 pp 86–89).

It has been known for many years that a corrugated adhesive whose carrier portion is prepared from a high amylose starch is superior to one prepared from pearl starch, which contains about 27% amylose, because a carrier can be produced having improved rheological and film-forming properties, and increased moisture resistance. There are strong indications that the tack of the carrier also plays an important role in the corrugating process. Recent developments indicate that further improvements in tack can be achieved by specific combinations of particular starches employed as the raw starch and carrier in high solids formulations. These improvements in tack and green bond strength permit higher corrugating machine speeds as compared to corrugating adhesives known in the prior art.

SUMMARY OF THE INVENTION

It has now been discovered that improved and superior green bond strength and tack is developed in alkaline curing corrugating adhesives by the combination of tapioca starch as the ungelatinized raw starch and a carrier comprising gelatinized (cooked) high amylose starch in high solids formulations. In accordance with the invention, a corrugating adhesive composition having improved tack and corrugator speeds is obtained with the following components:
1. an ungelatinized tapioca starch;
2. a carrier starch comprising a high amylose starch or high amylose starch blend;
3. alkali such as sodium hydroxide;
4. borax; and
5. water: wherein the ungelatinized starch, carrier starch, alkali, borax and water are present in amounts of 23–42%, 1–9%, 0.2–1.3%, 0.2–1.3%, 55–70%, by weight, respectively, based on the total adhesive composition. The ranges for the starch components are given on a "dry basis", (d.b.).

While in many corrugating adhesives in the prior art the ungelatinized starch can be used at a variety of starch solids, experience has indicated that in industry, most corrugators are using corrugating adhesives containing from about 18–26% (d.b.) by weight of total solids. In the present invention, the improved tack and speed requires the use of adhesives which contain from 30–45%, preferably from 30–40% by weight of total solids. In the preferred adhesives having 30–40% solids, the maximum amount of ungelatinized tapioca employed in these adhesives will amount to about 38% (d.b.) by weight of the total adhesive.

DETAILED DESCRIPTION OF THE INVENTION

The raw starch component of the adhesive, in accordance with the invention, is a tapioca starch. Small amounts of starches other than tapioca such as starches derived from corn, potato, wheat, waxy maize, as well as high amylose starches, can be employed in replacing a portion of the tapioca starch without any significant loss of properties in the adhesive. For example, up to 20% of the tapioca starch may be replaced with a starch such as waxy maize or corn starch.

The carrier component of the present adhesive comprises a high amylose starch, i.e., a hybrid corn starch having an amylose content of from about 50 to 75%.

Blends of high amylose starches and other starches which are not considered as having a high amylose content (namely those having an amylose content below 50%) are permissible. For purposes herein, the starch blend of the carrier component should contain at least 40% and preferably 50% by weight of amylose, and the high amylose starch (or blend thereof) employed as the carrier is used in an amount of from about 1 to 9% (d.b.) based on the weight of the adhesive.

The alkali (base) employed herein is preferably caustic soda, i.e., sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

In addition to the essential ingredients of the adhesive composition of this invention, any conventional non-chemically functional additives may be incorporated into the adhesive in minor amounts, if desired. Such additives include, for example, wetting agents, proteins, plasticizers, solubilizing agents, rheology modifiers, water conditioners, penetration control agents, peptizers such as urea, gelatinization temperature modifiers, inert fillers such as clay and finely ground polymers, thickeners such as inorganic collodial clays, guar, hydroxyethyl cellulose, alginates, polyvinyl alcohol, polymers of ethylene oxide and the like, wet strength resins and emulsions such as polyvinyl acetate.

In the preparation of the corrugating adhesives herein, the preparation method used by the practitioner can vary without serious consequences. Ordinarily, however, the carrier starch is first gelatinized (cooked) in a portion of the water with the alkali (caustic soda) to provide the carrier component of the adhesive. In a separate vessel, a mixture or slurry is made of the raw starch, borax and remaining water. The carrier and raw starch mixture are combined to form the final adhesive. Optional ingredients, if desired, can be added at any convenient point during the preparation of either component but are usually added to the finished adhesive.

The adhesive thus obtained can be used to bond single or double-faced boards using any equipment which is presently employed for the preparation of corrugated board. Thus, the adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The examples which follow illustrate specific embodiments of the invention. In the examples all parts and percentages are given by weight and all temperatures in degrees Fahrenheit and degrees Celsius.

The following testing procedure was used in the examples to characterize the tack of the various adhesives herein in preparing corrugated board.

TEST PROCEDURE

In evaluating the various adhesives for tack and green strength, the test adhesive was employed on a single-facer pilot plant corrugator in producing corrugated board using standard 69 lb./MSF wet strength liner board and 33 lb./MSF wet strength medium The corrugated single-faced web is taken immediately after production as the corrugator was running with each of the test adhesives. A sufficient portion of the liner was separated from the medium so as to enable the attachment of dial-type spring scale with a 2,000 g. capacity The liner was separated from the medium in a continuous fashion as the green bond strength (tack) is building with time. The time taken to achieve 2,000 g. of tack (green bond) was recorded. On a relative basis, the shorter the time required to achieve the 2,000 g. of tack (the point where fiber tear begins to develop), the faster the adhesive will run on the corrugator.

EXAMPLE I

This example illustrates the preparation of a corrugating adhesive representative of the invention and illustrates its improved tack and running speeds as compared to two prior art adhesives.

A carrier component was prepared by cooking at 105° F. (41° C.) 1,200 g. (1,056 g. d.b.) of a high amylose starch (amylose content 67–72%) in 6,560 g. of water and 240 g. of a 50% solution of sodium hydroxide until the starch was gelatinized. In a separate vessel, 7,200 g. (6,336 g. d.b.) of tapioca starch was added to 8,225 g. of water at 90° F. (32° C.), followed by the addition of 96 g. of borax (decahydrate) to provide a raw starch slurry. After 10 minutes of moderate agitation, the carrier starch cook was slowly added to the raw starch slurry and moderate agitation was continued. This adhesive was designated "Adhesive A".

Two prior art corrugating adhesives, designated "Adhesive B" and "Adhesive C", were prepared as follows.

Adhesive B—A carrier component was prepared by cooking at 160° F. (71° C.) for about 20 minutes 570 g. (502 g. d.b.) of corn starch (amylose content about 27%) in 3,753 g. of water and 96 g. (dry) of sodium hydroxide. The starch was gelatinized at the end of the 20-minute period. In a separate vessel, 3,600 g. (3,168 g. d.b.) of corn starch was slurried in 7,756 g. of water at 90° F. (32° C.), followed by the addition of 96 g. of borax (decahydrate). After 10 minutes of moderate agitation, the carrier cook was slowly added to the raw starch slurry with moderate agitation.

Adhesive C—A carrier component was prepared by cooking at 160° F. (71° C.) for 20 minutes 540 g. (475 g. d.b.) of corn starch (amylose content about 27%) in 4,505 g. of water with 300 g. of a 50% solution of sodium hydroxide. In a separate vessel, 8,640 (7,603 g. d.b.) of corn starch was slurried in 9,910 g. of water at 90° F. (32° C.), followed by the addition of 115.2 g. of borax (decahydrate). After 10 minutes of stirring, the carrier cook was slowly added with agitation to the raw starch slurry.

Table I characterizes the three adhesives and summarizes the results achieved in evaluating the adhesives in the tack test described above.

TABLE I

|  | Adhesive A | Adhesive B | Adhesive C |
|---|---|---|---|
| Raw Starch | tapioca | corn | corn |
| Carrier | high amylose | corn | corn |
| Total Solids of Adhesive | 32.3% | 24.3% | 34.7% |
| Time to reach 2,000 g. of tack | 7 sec. | 23 sec. | 15 sec. |

The data shows superior tack was achieved with Adhesive A of the invention as compared to Adhesives B and C.

EXAMPLE II

The adhesives of the invention have been found to exhibit superior tack in preparing corrugated board employing a liner board which has been treated to provide a moisture resistant surface. Experience has shown that such surfaces are difficult to adhere with conventional adhesives of the prior art.

An adhesive representative of the invention, Adhesive A of Example I, was compared to two adhesives of the prior art; Adhesive C of Example I and Adhesive D prepared as follows:

Adhesive D—This adhesive is prepared identical to Adhesive A of Example I except that the tapioca raw starch was replaced with corn starch.

Table II characterizes the adhesives and summarizes the results achieved in the tack test described above in which the liner used was 42 lb./MSF paper coated with thermoset resin for providing moisture resistance.

TABLE II

|  | Adhesive A | Adhesive C | Adhesive D |
|---|---|---|---|
| Raw Starch | tapioca | corn | corn |
| Carrier | high amylose | corn | high amylose |
| Total solids of adhesive | 32.3% | 34.7% | 32.3% |
| Time to reach 2,000 g. of tack | 18 sec. | 50 sec. | 30 sec. |

Again, the data shows the adhesive of the invention to have superior tack as compared to the described prior art adhesives.

EXAMPLE III

The following example describes an evaluation run on a commercial type corrugator.

An adhesive representative of the invention, designated Adhesive E, was prepared as follows. A carrier component was prepared by cooking at 100° F. (38° C.) 14 lbs. (12.4 lbs. d.b.) of high amylose starch (amylose content 67–72%) in 74 lbs. of water and 4.6 lbs. of a 50% solution of sodium hydroxide until the starch was gelatinized. In a second container, 140 lbs. (123.2 lbs. d.b.) of tapioca starch was slurried in 163 lbs. of water at 105° F. (41° C.) to which was added 1.3 lbs. of borax (decahydrate). To provide the final adhesive, the high amylose carrier cook was slowly added to the raw starch slurry.

A prior art adhesive, designated Adhesive F, was prepared as follows. A carrier was prepared by adding 150 lbs. (132 lbs. d.b.) of starch containing approximately 30% amylose to 1,460 lbs. of water at 130° F. (54° C.). Thereafter 28 lbs. of dry caustic and 10 lbs. of borax (decahydrate) was added and the mixture was cooked for about 20 minutes, after which 1,250 lbs. of cooling water was added. In another container 1,100 lbs. (968 lbs. d.b.) of cornstarch was added to 1,420 lbs. of water containing 15 lbs. of borax (decahydrate). The final adhesive was provided by adding the carrier starch cook to the corn starch slurry with moderate agitation.

Each of the adhesives was run on a full size corrugator with the maximum speed obtainable without delamination being noted. Results are summarized in Table III.

TABLE III

|  | Adhesive E | Adhesive F |
|---|---|---|
| Raw Starch | tapioca | corn |
| Carrier | high amylose | 30% amylose |
| Total solids of adhesive | 35.1% | 27.5% |
| Running speed maximum | 750 fpm.* | 475 fpm. |

*feet per minute

EXAMPLE IV

In this example, Adhesive E of Example III was compared against a prior art adhesive described below by running on a full size corrugator using 76 lbs./MSF liner and 33 lbs./MSF waxed medium.

The prior art adhesive used herein was prepared by cooking 200 lbs. (176 lbs. d.b.) of a carrier starch whose amylose content was approximately 38%, in 835 lbs. of water at 130° F. (54° C.). Sodium hydroxide, 38 lbs. dry, was added and the starch allowed to cook for 18 minutes after which time cooling water totaling 60 lbs. was then added. In a second container, 1,300 lbs. (1,144 lbs. d.b.) of corn starch was added to 3,087 lbs. of water containing 19 lbs. of borax (pentahydrate) to provide a raw starch slurry. The final adhesive was prepared by adding the carrier to the raw starch slurry with moderate mixing. The solids of this adhesive totaled 24.9% by weight.

In running the above paper stock, maximum speeds of 755 fpm. were obtained with Adhesive E of the invention while a maximum speed of 500 fpm. was obtained with the described prior art adhesive.

Now that the preferred embodiments of the present invention have been described in detail, various modifications and improvements thereon will become readily apparent to those skilled in the art. Accordingly the spirit and scope of the present invention is to be limited only by the appended claims, and not by the foregoing disclosure.

What is claimed is:

1. An alkaline curing starch-based corrugating adhesive comprising
   a. from about 23 to 42% of an ungelatinized tapioca starch,
   b. from about 1 to 9% of a gelatinized starch comprising at least 40% by weight of amylose,
   c. from about 0.2 to 1.3% of alkali,
   d. from about 0.2 to 1.3% of borax, and
   e. from about 55 to 70% water, wherein the percentages of the components are based on the total weight of the adhesive.

2. The corrugating adhesive of claim 1 wherein the gelatinized starch contains at least 50% by weight of amylose.

3. The corrugating adhesive of claim 1 wherein the gelatinized starch is a high amylose starch containing more than 50% amylose.

4. The corrugating adhesive of claim 1 which contains from about 0.2 to 1.3% of sodium hydroxide and 60 to 70% water.

5. In an alkaline curing starch-based corrugating adhesive of the type employing a raw ungelatinized starch and a gelatinized starch carrier, the improvement comprising: employing 23 to 42% ungelatinized tapioca starch in combination with 1 to 9% of a gelatinized starch comprising at least 40% of amylose, taken in amounts such that the total solids of the adhesive is from 30 to 45% solids by weight.

6. The corrugating adhesive of claim 5 wherein the gelatinized starch contains at least 50% by weight of amylose.

7. The corrugating adhesive of claim 5 wherein the gelatinized starch is a high amylose starch containing more than 50% amylose.

8. The corrugating adhesive of claim 5 which contains from about 0.2 to 1.3% of sodium hydroxide and 60 to 70% water.

9. In a process for preparing a corrugated paperboard comprising the steps of a. applying to the tips of the corrugations of a fluted paper strip a corrugating adhesive comprising ungelatinized raw starch and a gelatinized starch carrier, alkali, borax and water, and b. applying a facing to the adhesive coated tips of said fluted paper strip to form an adhesive bond; the improvement wherein said corrugated adhesive composition contains from about 23 to 42% of ungelatinized tapioca starch in combination with 1 to 9% of a gelatinized starch comprising at least 40% by weight of amylose, taken in amounts such that the total solids of the adhesive is from 30 to 45% solids by weight.

10. The process of claim 9 wherein the gelatinized starch employed in the adhesive is a high amylose starch containing more than 50% amylose.

11. The process of claim 9 wherein the gelatinized starch employed in the adhesive contains at least 50% by weight of amylose.

12. The process of claim 9 wherein the adhesive contains from 0.2 to 1.3% of sodium hydroxide and 60 to 70% of water.

* * * * *